US012618495B2

(12) United States Patent
Boller

(10) Patent No.: US 12,618,495 B2
(45) Date of Patent: May 5, 2026

(54) APPARATUS FOR INSERTING AND POSITIONING A PIPELINE LINING IN A PIPE AND METHOD FOR INSERTING AND POSITIONING A PIPELINE LINING IN A PIPE

(71) Applicant: BODUS GmbH, Aarau (CH)

(72) Inventor: Daniel Boller, Wittnau (CH)

(73) Assignee: BODUS GmbH, Aarau (CH)

( * ) Notice: Subject to any disclaimer, the term of this patent is extended or adjusted under 35 U.S.C. 154(b) by 452 days.

(21) Appl. No.: 18/276,941

(22) PCT Filed: Feb. 8, 2022

(86) PCT No.: PCT/EP2022/053005
§ 371 (c)(1),
(2) Date: Aug. 11, 2023

(87) PCT Pub. No.: WO2022/171622
PCT Pub. Date: Aug. 18, 2022

(65) Prior Publication Data
US 2024/0117900 A1 Apr. 11, 2024

(30) Foreign Application Priority Data
Feb. 12, 2021 (EP) ..................................... 21156936

(51) Int. Cl.
*F16L 9/22* (2006.01)
*B29C 63/28* (2006.01)
(Continued)

(52) U.S. Cl.
CPC ................ *F16L 9/22* (2013.01); *B29C 63/28* (2013.01); *B29C 63/36* (2013.01); *F16L 55/1651* (2013.01)

(58) Field of Classification Search
CPC ........ F16L 9/22; F16L 55/1651; B29C 63/28; B29C 63/36
(Continued)

(56) References Cited

U.S. PATENT DOCUMENTS

| | | | | |
|---|---|---|---|---|
| 3,927,164 A | * | 12/1975 | Shimabukuro | ...... B29D 23/001 156/247 |
| 4,077,610 A | * | 3/1978 | Masuda | ................ B29C 63/343 604/271 |

(Continued)

FOREIGN PATENT DOCUMENTS

| | | |
|---|---|---|
| JP | 2006-205722 A | 8/2006 |
| KR | 101148135 B1 | 5/2012 |

(Continued)

OTHER PUBLICATIONS

Decision to Grant a Patent for Japanese Patent Application No. 2023-547667, dated Jul. 18, 2025, 3 pages.
(Continued)

*Primary Examiner* — Muhammad Ijaz
(74) *Attorney, Agent, or Firm* — Lippes Mathias LLP

(57) ABSTRACT

The invention relates to an apparatus (10) for inserting a pipeline lining (80) into a pipe (100) and for final positioning of the pipeline lining (80) inserted in a pipe (100). According to the invention, the apparatus comprises a housing (20), especially a drum-shaped housing, wherein a winding apparatus (25) is formed in the housing (20) and an attachment element (35), especially an attachment ring, is formed on a first housing opening (21), wherein either a cover plate (45) or an inverter add-on (40) is fastened to an at least second housing opening (22), wherein, in a first state for inserting the pipeline lining (80), the inverter add-on (40) and, in a
(Continued)

Figure 1A:
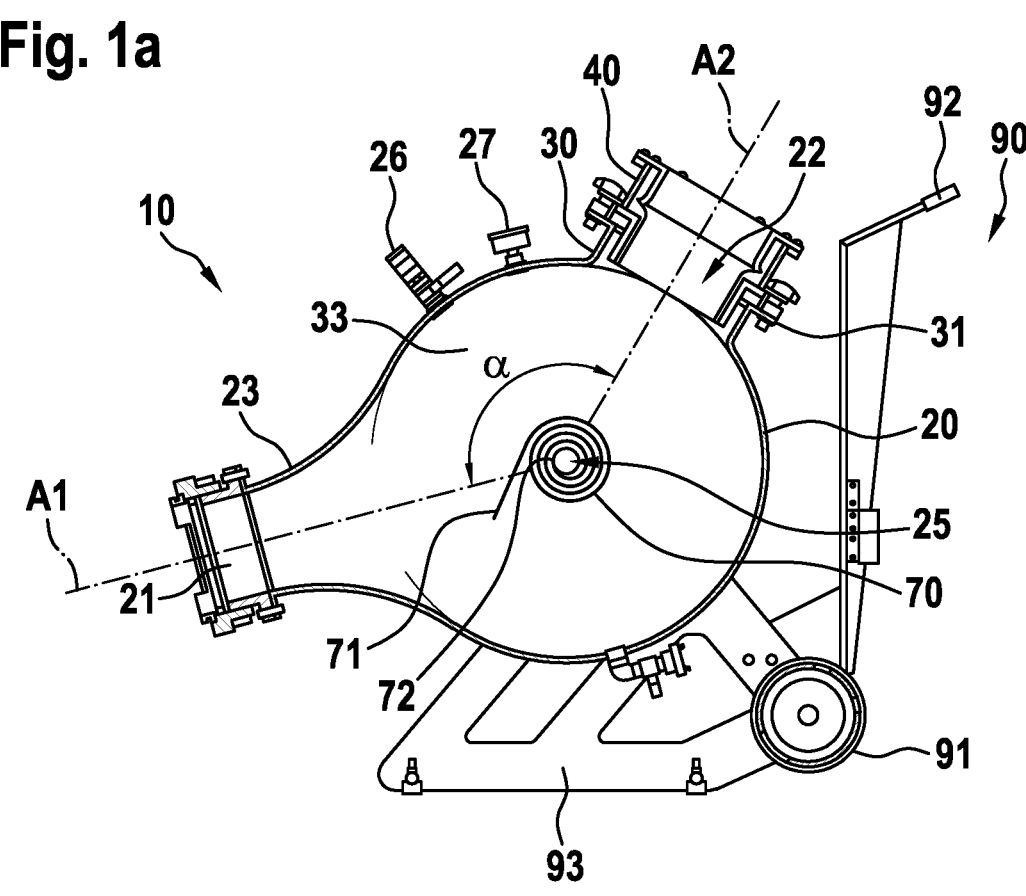

second state for final positioning of the pipeline lining (80), the cover plate (45) is fastened to the second housing opening (22).

14 Claims, 5 Drawing Sheets

(51) Int. Cl.
    *B29C 63/36*           (2006.01)
    *F16L 55/165*        (2006.01)

(58) Field of Classification Search
    USPC ........................................................ 138/98
    See application file for complete search history.

(56)             References Cited

U.S. PATENT DOCUMENTS

| | | | | |
|---|---|---|---|---|
| 4,427,480 | A * | 1/1984 | Kamuro | B29C 63/36 |
| | | | | 264/516 |
| 6,032,698 | A * | 3/2000 | Schwert | B29C 63/36 |
| | | | | 138/97 |
| 7,517,212 | B2 * | 4/2009 | Blackmore | F16L 55/1654 |
| | | | | 425/13 |
| 11,204,124 | B2 * | 12/2021 | Sterner | B65H 75/446 |
| 2006/0048832 | A1 * | 3/2006 | Blackmore | B29C 63/36 |
| | | | | 138/98 |
| 2006/0159791 | A1 * | 7/2006 | Kamiyama | B29C 63/36 |
| | | | | 264/516 |
| 2009/0014080 | A1 * | 1/2009 | Blackmore | B29C 63/36 |
| | | | | 405/150.1 |
| 2016/0096188 | A1 * | 4/2016 | Tanner | B05D 7/222 |
| | | | | 427/230 |
| 2018/0229424 | A1 * | 8/2018 | Bichler | F16L 55/18 |
| 2018/0292041 | A1 * | 10/2018 | Lokkinen | B65H 75/4471 |
| 2020/0263821 | A1 * | 8/2020 | Sterner | F16L 55/18 |
| 2021/0172556 | A1 * | 6/2021 | Dahl-Nielsen | F16L 55/18 |
| 2024/0117900 | A1 * | 4/2024 | Boller | B29C 63/36 |

FOREIGN PATENT DOCUMENTS

| | | |
|---|---|---|
| KR | 20180000155 A | 1/2018 |
| WO | 2020116097 A1 | 11/2020 |

OTHER PUBLICATIONS

International Search Report for PCT/EP2022/053005, dated Apr. 6, 2022, 4 pages.

* cited by examiner

APPARATUS FOR INSERTING AND POSITIONING A PIPELINE LINING IN A PIPE AND METHOD FOR INSERTING AND POSITIONING A PIPELINE LINING IN A PIPE

The invention relates to an apparatus for inserting a pipeline lining into a pipe and for final positioning of the pipeline lining inserted in a pipe, wherein the apparatus comprises a housing, wherein a winding apparatus is formed in the housing and an attachment element is formed on a first housing opening, wherein either a cover plate or an inverter add-on is fastened to an at least second housing opening, according to claim 1.

In addition, the invention relates to a method for inserting a pipeline lining in a pipe and for final positioning of the pipeline lining inserted in a pipe, wherein the apparatus according to the invention is used to carry out the method.

It is known from the prior art to provide the interior of pipelines with a pipeline lining, which for example has an outer plastics layer and an inner fibre composite layer. Such pipeline linings have to be inserted here subsequently into pipes already laid, for example in the ground.

Furthermore, it is often necessary that the pipeline linings already inserted have to be readjusted in respect of the actual position. It is known here for example to produce an ultimate or final position of the pipeline lining subsequently by means of calibration tubes. To this end it is necessary to use an apparatus with the aid of which the calibration tube can be inserted into an already laid pipeline lining portion.

Multiple apparatuses are thus necessary in order to insert a pipeline lining into a pipe and then be able to position the pipeline lining correctly.

An aim of the present invention is therefore to describe a further developed apparatus, wherein the aforementioned disadvantages are to be overcome.

It is furthermore an aim of the invention to describe a further developed method for inserting and positioning a pipeline lining.

The stated aims are addressed in accordance with the invention in respect of an apparatus for inserting a pipeline lining in a pipe and for final positioning of the pipeline lining inserted in a pipe by the article as per claim 1 and in respect of a method for inserting a pipeline lining into a pipe and for final positioning of the pipeline lining inserted in a pipe by the method according to claim 6.

The dependent claims comprise at least expedient embodiments and developments.

Specifically, the aim is addressed by an apparatus for inserting a pipeline lining into a pipe and for final positioning of the pipeline lining inserted in a pipe, wherein the apparatus comprises a housing, especially a drum-shaped housing, wherein a winding apparatus is formed in the housing and an attachment element, especially an attachment ring, is formed on a first housing opening. Either a cover plate or an inverter add-on is fastened to an at least second housing opening, wherein, in a first state for inserting the pipeline lining, the inverter add-on and, in a second state for final positioning of the pipeline lining, the cover plate is fastened to the second housing opening.

According to the invention, an apparatus is thus provided with the aid of which both a pipeline lining can be inserted into a pipe and the already inserted pipeline lining can be arranged in its final position.

The apparatus can thus be present at least in two states. A first state may be the state for inserting the pipeline lining. In this first state an inverter add-on is fastened to at least the second housing opening.

A second state of the apparatus may be the state for final positioning of the pipeline lining. In this second state, the pipeline lining would already be located or inserted in the pipe. In the second state, a cover plate is fastened to the pipe. It is possible that the housing has further housing openings. However, at least two openings are formed, wherein an attachment element is formed on the first housing opening and the at least second housing opening is closed either with an inverter add-on or with a cover plate.

It is possible that the apparatus is also present in a third state. Such a state may be a maintenance state or cleaning state. In such a state it is possible that the second housing opening is open or no further components are fastened to or mounted on the second housing opening.

The housing preferably has a drum shape. The drum shape can be seen especially in a side view of the housing. This side view is such that the view is directed in the axial direction of the winding apparatus. By means of such a drum-shaped design of the housing it is possible to wind a tube, especially a calibration tube, on the winding apparatus, as is usual with the aid of a coiler.

An attachment element is formed on the first housing opening. The attachment element may be a portion of the housing or a separate component. It is furthermore possible that the attachment element is formed both from a housing portion and a separately attached component. Both one end of the pipeline lining as well as one end of the calibration tube are guided from the first housing opening. This is dependent on the state in which the apparatus is currently present, or which method step is to be performed with the aid of the apparatus according to the invention. The second housing opening is used especially to insert a pipeline lining into the housing. In other words, the second housing opening is required especially in the first state of the apparatus. In the second state of the apparatus according to the invention it is necessary especially to close the second housing opening.

It is possible that the drum-shaped housing has a tubular tapering in a portion pointing towards the first housing opening. This tubular tapering can also be referred to as a beak-like housing portion. The beak-like housing portion simplifies especially the alignment of the apparatus in relation to the pipe in which the pipeline lining is to be inserted or is to be arranged in a final position.

An additional component, for example a (further) attachment element, especially a (further) attachment ring, could then be fastened to a housing portion of this type.

A final positioning of the pipeline lining inserted in a pipe describes the positioning of a pipeline lining in a pipe so that the pipeline lining either already bears tightly against the pipe or is positioned correctly in the pipe in such a way that a further processing of the pipeline lining, for example a curing of the pipeline lining, can be performed.

The inverter add-on is a component that can be mounted releasably on the second housing opening. Hereinafter, a component that is necessary during the insertion of a pipeline lining denotes an inverter add-on. The pipeline lining can be inserted into the housing with the aid of the inverter add-on and then inserted into the pipe, in such a way that the pipeline lining is present in the pipe in inverted form in comparison to the initial state. The initial state of the pipeline lining is understood to mean the state that is present prior to the insertion of the pipeline lining into the apparatus according to the invention, especially prior to insertion of the pipeline lining into the pipe. The inverter add-on can also be referred to as a pipeline lining adapter.

The inverter add-on can be screwed into the second housing opening. To this end the inverter add-on preferably has a flange-like portion. The flange-like portion preferably has openings, wherein fastening elements, especially fastening screws, can be guided through these openings. A flange-like portion is preferably formed in the region of the second housing opening of the apparatus, so that a flange-like portion of the second housing opening bears against the flange-like portion of an inverter add-on. The releasable connection can then be established by means of fastening elements, especially by means of screws or by means of screw-and-nut connections.

It is possible that the inverter add-on has a sealing sleeve and/or a compressed air port. With the aid of a sealing sleeve it is possible to seal the inverter add-on and consequently the second housing opening of the apparatus in such a way relative to a pipeline lining to be inserted that a pressure acting on the pipeline lining is not lost, but instead acts directly on the pipeline lining. This simplifies the insertion of a pipeline lining into a pipe.

Furthermore, the inverter add-on can have at least one compressed air port. The compressed air port can be used especially to produce a sufficient seal with the aid of a sealing sleeve. To this end the inverter add-on preferably has a flexible chamber portion. The flexible chamber portion is formed for example between a sealing sleeve and an inverter housing portion. Compressed air can be pumped into this flexible chamber portion with the aid of a compressed air port, in such a way that the sealing sleeve is expanded and the chamber portion is enlarged. In this form, the sealing sleeve can be pressed against the pipeline lining.

The sealing sleeve is preferably formed from a rubber-like material.

In a further embodiment of the invention it is provided that the housing of the apparatus has a compressed air port. The compressed air port can be used to set the housing itself under pressure. For example, this is performed in the second state of the apparatus. This facilitates, for example, the deployment of a calibration tube.

The inverter add-on may additionally have a pressure discharge opening. The compressed air formed in the inverter add-on can escape with the aid of a pressure discharge opening.

The housing can have a compressed air discharge opening. A pressure formed in the housing of the apparatus can be discharged with the aid of the compressed air discharge apparatus.

In a preferred embodiment of the invention a guide portion is formed in the housing of the apparatus for guiding through the pipeline lining. The guide portion runs starting from the second housing opening to the first housing opening. The pipeline lining is to be guided from the second housing opening to the first housing opening with the aid of the guide portion.

The at least first and second housing opening are arranged in the housing in such a way that the opening axes intersect one another in the centre in the housing of the apparatus. The housing centre is preferably the portion of the housing that corresponds to the longitudinal axis of the winding apparatus. In other words, the opening axes of the first housing opening and the second housing opening intersect one another in the region of the longitudinal axis of the winding apparatus. The housing opening axes preferably run at an obtuse angle to one another. This means that a pipeline lining does not have to be strongly bent starting from the second housing opening in the direction of the first housing opening. Rather, the pipeline lining can also run in a straight line, at least in portions, in the state guided in the apparatus.

The obtuse angle of the housing opening axes is preferably between 110° and 150°, especially preferably between 140° and 145°, especially preferably between 130° and 140°.

In the first state, a calibration tube is preferably wound on the winding apparatus. The winding apparatus can be, for example, an electrically operable winding apparatus, Furthermore, the winding apparatus preferably has a locking means, so that the winding apparatus is secured against undesirable unwinding and winding. The locking means is preferably to be engaged accordingly in the first state of the apparatus.

The housing of the apparatus is preferably fastened on a transport apparatus. The transport apparatus may be a sack barrow-like apparatus. The transport apparatus preferably has at least two wheels or rollers and at least one grip unit, so that the apparatus according to the invention can be easily transported.

A further aspect of the invention relates to a method for inserting a pipeline lining into a pipe and for final positioning of the pipeline lining inserted in a pipe.

The method according to the invention provides a use of the apparatus according to the invention. The method according to the invention comprises the following steps:

a) providing an apparatus according to the invention, wherein a calibration tube is wound on the winding apparatus, b) fastening the inverter add-on to the second housing opening, c) guiding a first end of the pipeline lining from the second housing opening to the first housing opening and fastening the first end of the pipeline lining to the attachment element, d) building up a pressure, especially by means of compressed air, at the inverter add-on and/or in the housing, e) inserting the pipeline lining into the pipe.

Steps a) to e) according to the invention are preferably to be carried out in the stated order. It is possible that steps a) and b) be carried out for example at the same time or in a swapped order. It is important when carrying out the stated steps that, firstly, a first state of the apparatus for inserting the pipeline lining into a pipe is produced.

It is possible that, between step c) and e), a support tube is laid in portions in the direction of the pipe, wherein the support tube, drawn over the first end of the pipeline lining, is fastened to the attachment element.

With the aid of the support tube, which preferably bridges the free portion between the first opening of the apparatus and the start of the pipe to be processed or repaired, the pipeline lining can be inserted easily into the pipe. The support tube serves in this case as a type of guide, so that the pipeline lining can be inserted purposefully into the pipe.

The support tube can be inserted for example until it is in the pipe to be repaired or the pipe to be processed. For example, the support tube may extend approximately 10 cm into the pipe to be processed. The support tube is preferably guided over the first end of the pipeline lining and is fastened to the attachment element, especially to the attachment ring, in this state applied at the first end of the pipeline lining. The fastening can be achieved for example by means of tension straps and/or tension rings.

The support tube is inserted between step c) and e). This step is preferably performed between steps c) and d).

In step c) the first end of the pipeline lining is fastened to the attachment element. To this end, the tubular pipeline lining is firstly guided through the housing and turned over at the first end. At the first end of the pipeline lining, the inner side of the pipeline lining is thus turned outwards so that the initially inner side of the pipeline lining then forms the outer side in the state fastened to the attachment element.

On account of the fastening of the first pipeline lining, in an outwardly turned form, to the attachment element, the pipeline lining can be inserted fully turned inside out in the pipe when inserting the pipeline lining into the pipe. On account of this outward turning of the pipeline lining, the pipeline lining can be impregnated with resin mixtures in an especially preferred way. The resin is applied preferably inside the pipeline lining and is only moved outwards in the pipe on account of the outward turning, in such a way that especially simple handling of the pipeline lining already impregnated with resin is made possible.

Step a) can additionally provide that, when providing the apparatus according to the invention, for example a retaining cord is connected to the apparatus and for example is coiled together with a circulation tube and a condensate discharge tube in the apparatus.

The calibration tube is preferably wound on the winding apparatus in such a way that the second end of the calibration tube is wound first on the winding apparatus. The second end of the calibration is to be understood as the end of the calibration tube that, during an unwinding process of the calibration tube, is unwound last or represents the last-unwound piece of the calibration tube.

In step c) the first end of the pipeline lining can be fastened to the attachment element for example by means of tension straps and/or tension rings.

In a further embodiment of the invention the method comprises the step f). According to step f), once step e) has been completed, the pressure is discharged from the inverter add-on and/or from the housing. In other words, once the pipeline lining has been fully inserted into the pipe, the previously applied pressure is firstly discharged from the inverter add-on and/or from the housing.

Only once the pressure has been discharged can the inverter add-on be removed from the housing in step g). The cover plate can then be fastened to the second housing opening in such a way that the second housing opening is closed.

In the first state of the apparatus, the second housing opening is not fully closed. Rather, a type of access to the housing is produced by means of the inverter add-on so that the pipeline line can be inserted into the apparatus from outside by means of the inverter add-on.

It is additionally possible that in a step h) the first end of the pipeline lining and optionally fastened support tube are removed from the attachment element. The step h) is preferably performed after step f). It is possible that the step h) is performed after the step g). Furthermore, it is possible that the step h) is performed between the steps f) and g).

If step h) has been performed, there is no further component and/or no further tube portion bearing initially against the attachment element.

It is possible that in step i) a first end of the calibration tube is unwound from the winding apparatus and is fastened to the attachment element. The first end of the calibration tube is fastened to the attachment element preferably in such a way that the calibration tube is likewise turned outwards and in this outwardly turned form is fastened to the attachment element. The fastening to the attachment element can be achieved by means of tension straps and/or tension rings.

In accordance with a step j) it is possible that the first end of the pipeline lining and optionally the support tube are in turn drawn over the first end of the calibration tube and fastened to the attachment element. The first end of the pipeline lining firstly, and then the support tube, can be guided over the calibration tube mounted on the attachment element, so that, from the inside out, the first end of the calibration tube, the first end of the pipeline lining, and optionally the support tube can be mounted on and fastened to the attachment element.

With such a fastening of the pipeline lining and of the support tube, it is possible that the calibration tube acts especially well, since neither the pipeline lining nor an optionally provided support tube are displaced undesirably during the calibration process. By attaching the support tube, the calibration tube is in turn guided well from the first housing opening to the start of the pipe. In this case too, the support tube can extend into the pipe by approximately 10 cm.

In step k) such a pressure is built up in the housing that the calibration tube is positioned and expanded on account of the pressure build-up in the pipeline lining, and the pipeline lining is thus arranged in its final position. The calibration tube is unwound from the winding apparatus on account of the pressure build-up and is pushed increasingly further into the pipe, especially into the pipeline lining.

The calibration tube inverts from the apparatus into the pipeline lining. The process k) is preferably continued for such a length until the calibration tube is fully installed. If the apparatus has a retaining cord, length markers on the retaining cord can give information about the position of the calibration tube. The position of the second end of the calibration tube can be known at all times with the aid of the retaining cord.

The speed for execution of step k) can be controlled with the aid of the pressure built up in the housing and can be monitored with the aid of the retaining cord.

The pipeline lining can be constituted by resin-coated nonwoven tubes. Such pipeline linings are also known as tube liners. When inserting the pipeline lining into the pipe, the inner side of the pipeline lining is turned outwards. Insertion of a pipeline lining in this way is also referred to as inversion.

With the aid of an application of compressed air, in step e) the pipeline lining is completely ejected and is then present in inverted form. Following the fully correct positioning or the final positioning, the pipeline lining is present in such a form that the resin of the pipeline lining can be cured. A curing process of this type can be performed for example by means of steam and/or by means of infrared radiation. During the curing process, no further positioning steps need to be performed, since the pipeline lining is already in the correct position.

The method according to the invention is based on the fact that an apparatus according to the invention is used. With the aid of the apparatus according to the invention it is possible for the first time to carry out both the introduction or insertion of a pipeline lining and also the final positioning of the pipeline lining by means of a single apparatus. This is associated with a massive saving in apparatuses that need to be held available.

The invention will be explained in greater detail on the basis of exemplary embodiments with reference to the accompanying schematic drawings.

Figures 2A, 2B:
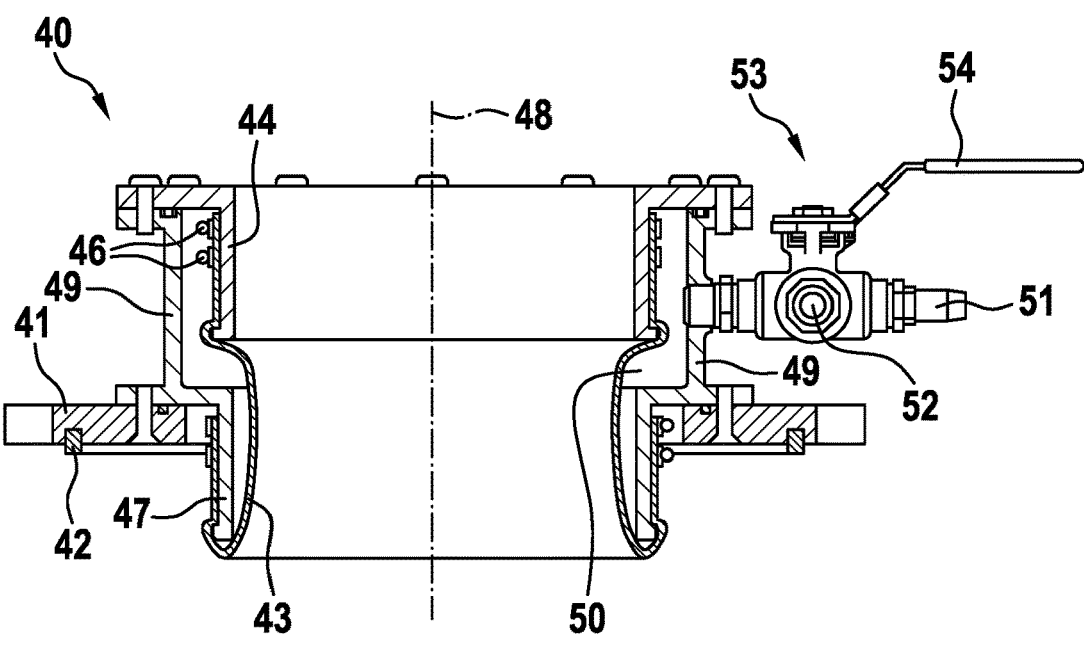
Figure 3A:
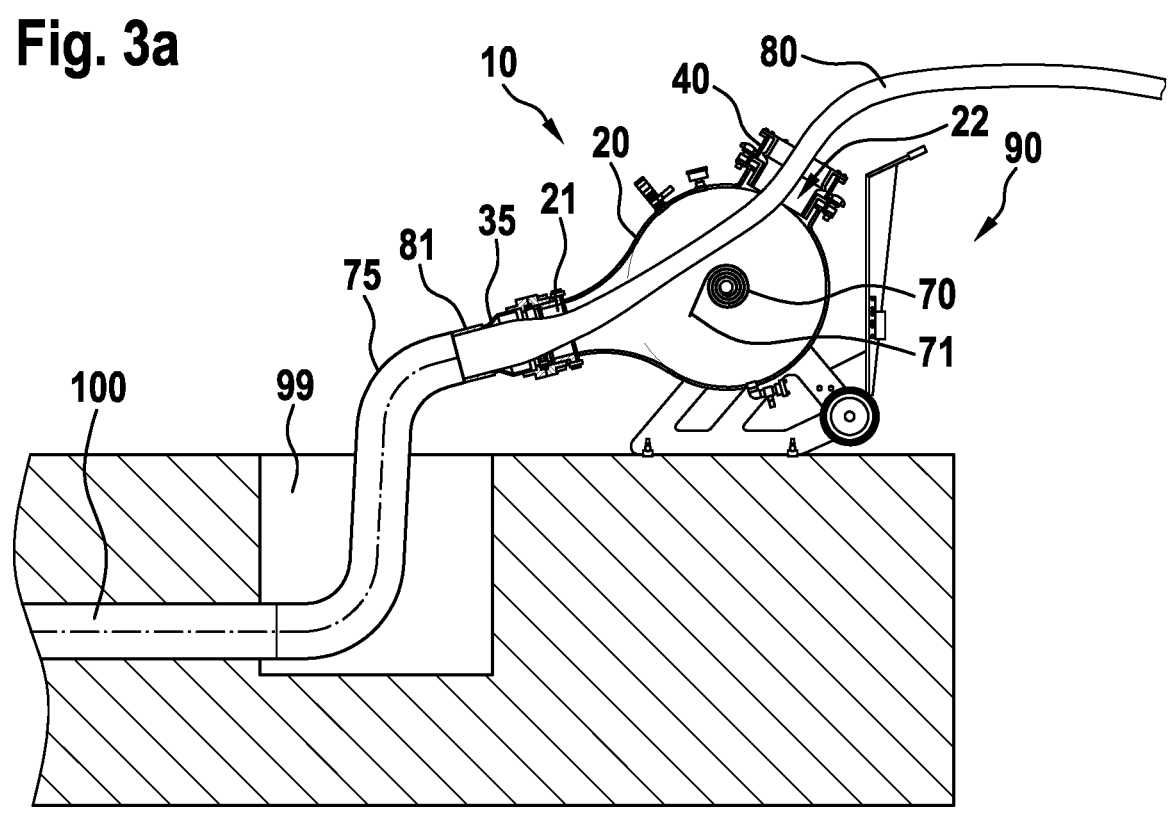
Figure 3B:
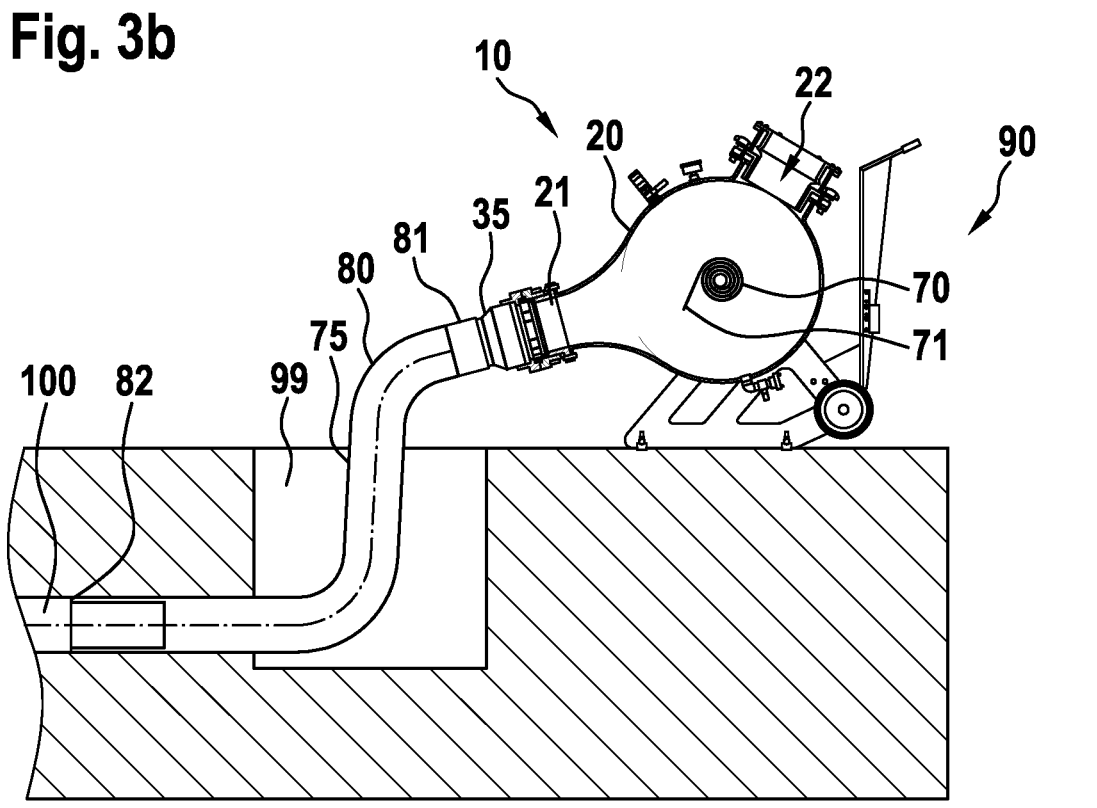
Figure 3C:
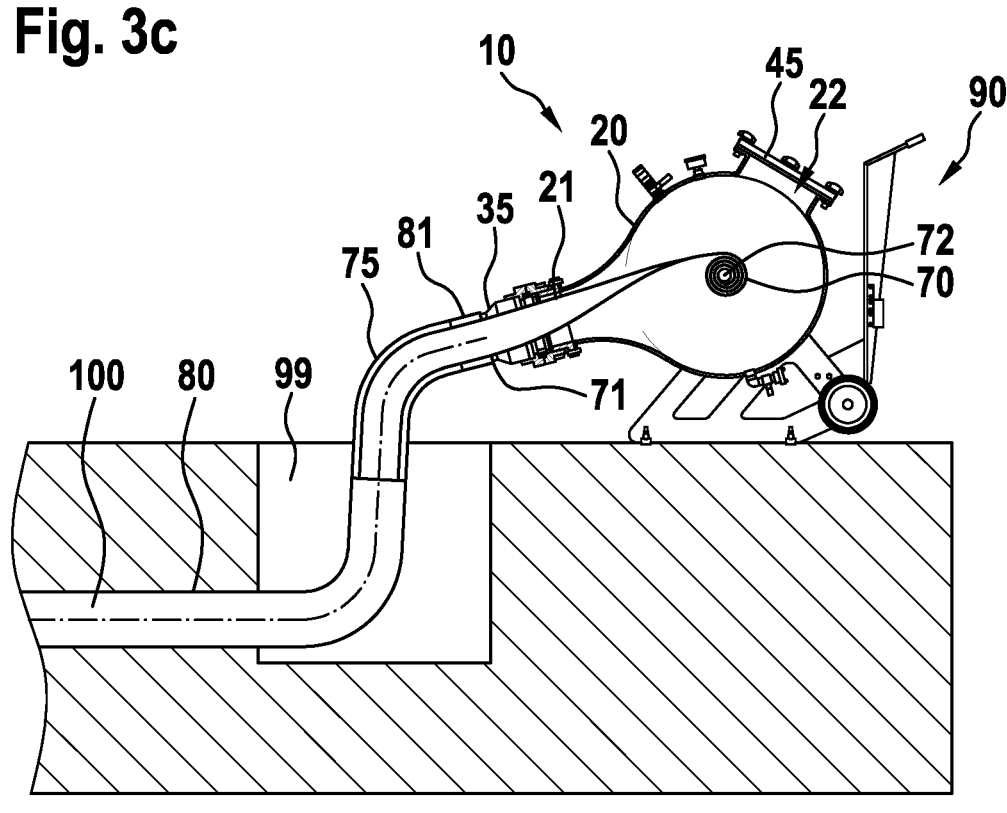

In the drawings:

FIG. 1a to is show the apparatus according to the invention in different states;

FIGS. 2a and 2b show a sectional depiction in respect of an inverter add-on without and with inserted pipeline lining; and FIGS. 3a and 3c show different stages of the method according to the invention.

Hereinafter, the same reference numerals are used for like and functionally like components.

FIG. 1a shows the primary structure of an apparatus 10 according to the invention. The apparatus 10 has a drum-shaped housing 20, wherein a winding apparatus 25 is formed in the housing 20. The winding apparatus 25 in the simplest case can be formed as a type of spindle, wherein a tube, specifically a calibration tube 70, can be wound on the winding apparatus 25.

The calibration tube 70 has a first end 71 and a second end 72. The second end 72 in the present case is coiled or wound first, so that the first end 71 is the last-wound or last-coiled end of the calibration tube 70. The housing 20 is secured on a transport apparatus 90. The transport apparatus 90 has substantially two rollers 91, a grip portion 92 and a frame 93. By means of the frame 93, among other things the transport apparatus is prevented from being able to tilt when stationary. The frame 93 thus allows the apparatus 10 to be securely positioned whilst the method according to the invention is being carried out.

The housing 20 has a drum shape substantially. The housing 20 additionally has a first housing opening 21 and a second housing opening 22. The housing 20 has a housing portion 23 pointing in the direction of the first housing opening 21. This housing portion 23 runs in a tapering fashion in the direction of the first housing opening 21. With the aid of a housing portion 23 of this type, a type of guide can be ensured in the housing 20.

Furthermore, the housing 20 has at least one compressed air port 26 and one compressed air display or a manometer 27.

In the region of the second housing opening 22, there is formed a housing opening portion 30. This housing opening portion 30 is used especially to fix different components. The housing opening portion 30 has a flange element 31 for this purpose.

The housing openings 21 and 22 have a first housing opening axis A1 and a second housing opening axis A2, respectively. It can be seen that the two housing opening axes A1 and A2 meet in the region of the winding apparatus 25, i.e. in the region of the longitudinal axis of the winding apparatus 25. The housing opening axes A1 and A2 lie at an angle α to one another. The angle α is preferably an obtuse angle and is preferably 135°.

Figure 1B:
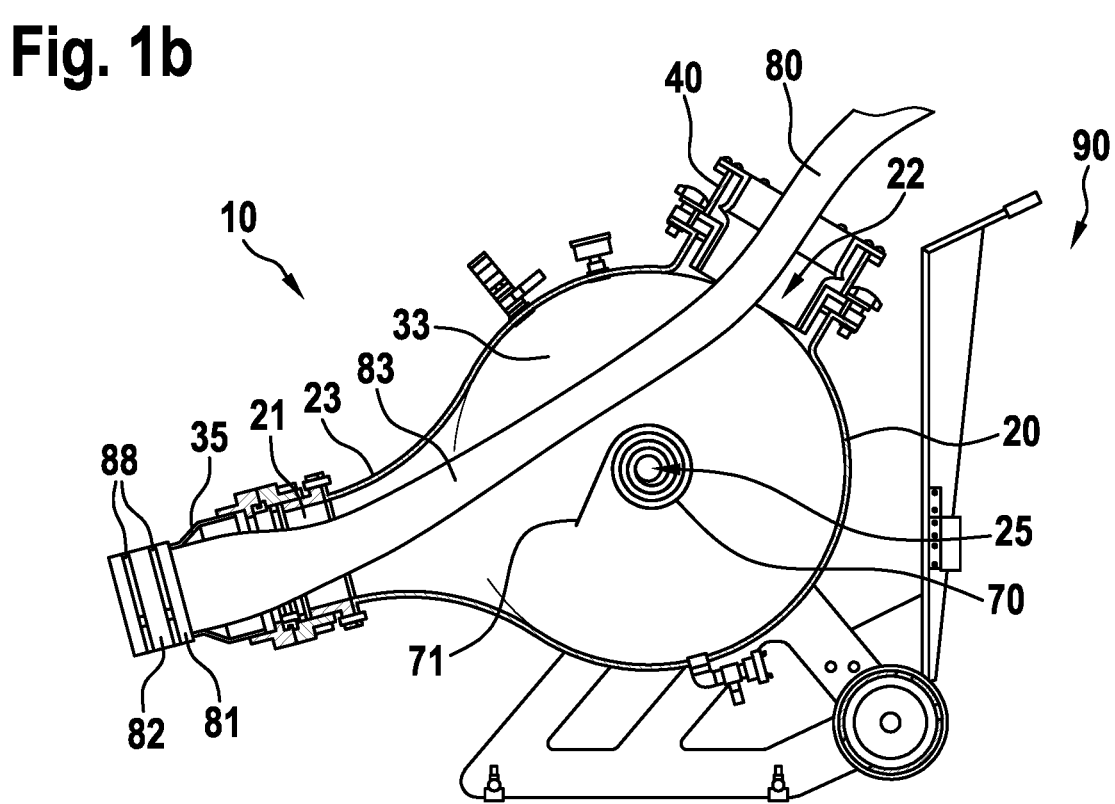

With such an angle it is possible to guide a pipeline lining relatively angle-free in the housing 20 (see FIG. 1b). In FIG. 1a an inverter add-on 40 is fastened to the housing opening 22. A more accurate depiction of the inverter add-on 40 can be seen in FIG. 2.

A guide portion 33 is additionally formed in the housing 20. A tube, especially a pipeline lining 80, can be guided with the aid of the guide portion 33 from the second housing opening 22 in the direction of the first housing opening 21.

In FIG. 1b the apparatus 10 is shown in accordance with a first state for inserting the pipeline lining 80 into a pipe. It can be seen that the pipeline lining 80 is guided from the second housing opening 22 to the first housing opening 21. At the first end 81 of the pipeline lining 80, the pipeline lining 80 is fastened to an attachment element 35. The attachment element 35 is an attachment ring.

The attachment element 35 in the shown example is fastened to the housing portion 23. It is also possible that the attachment element 35 is formed as a component integrated into the housing 20. The pipeline lining 80 is arranged on or fastened to the attachment element 35 by the first end 81 in such a way that the inner side 82 is turned outwards and in the fastened state forms the outer side of the pipeline lining 80. By contrast, in the state located in the apparatus 10, the outer side 83 can be seen.

The first end 81 of the pipeline lining 80 is preferably fitted on the attachment element 35 by means of tension straps 88.

In the first state of the apparatus 10, the winding apparatus 25 is fixed in such a way that the calibration tube 70 is not unwound from the winding apparatus 25 during the insertion of the pipeline lining 80.

Figure 1C:
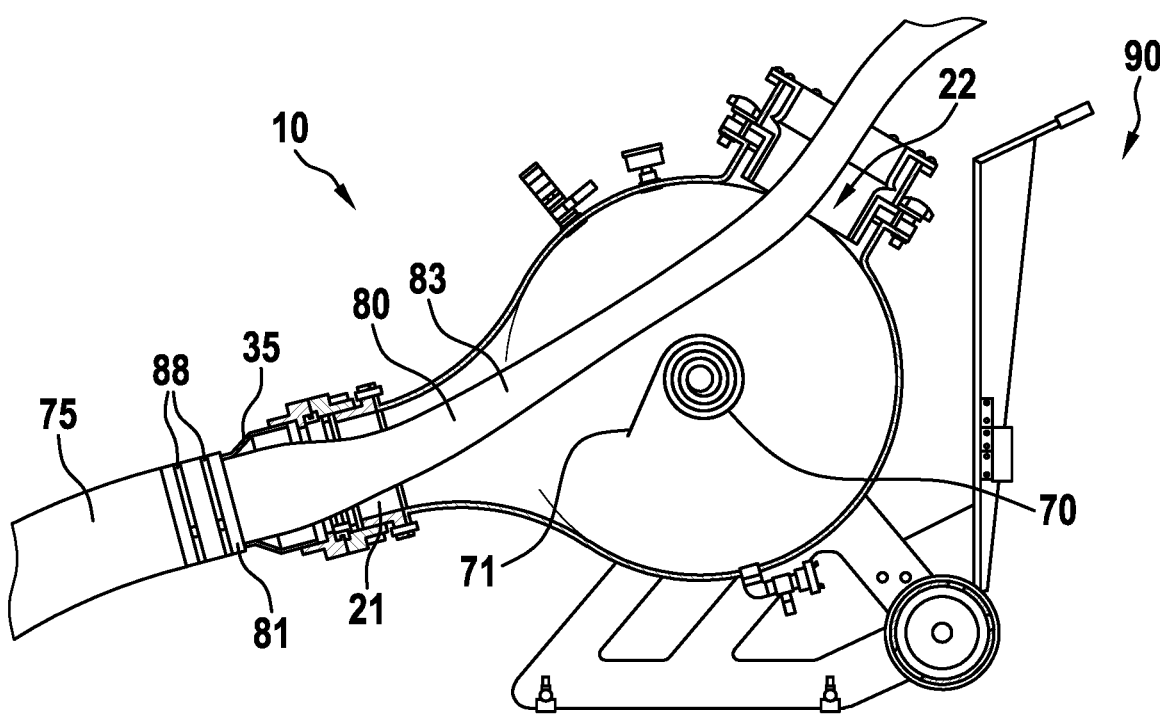

In FIG. 1c it is additionally shown that a support tube 75 can be fastened to the attachment element 35. The support tube is pushed over the turned-over first end 81 of the pipeline lining 80 and in the present case is likewise fastened by means of tension straps 88 to the attachment element 35. The support tube 75 is used to insert the pipeline lining into the pipe in a guided fashion. The support tube 75 preferably reaches into the pipe. For example, the support tube 75 can extend up to 10 cm into the pipe, so that the pipeline lining 80 can be introduced especially easily into the pipe, without the pipeline lining 80 being movable uncontrollably during the insertion process in the otherwise free space between the pipe and the first housing opening 21.

In FIG. 2a the inverter add-on 40 is shown in greater detail. A component that is necessary to insert a pipeline lining 80 into a pipe is to be understood as an inverter add-on, wherein the pipeline lining 80 is inserted in such a way that, during the insertion of the pipeline lining 80 into a pipe, the sides of the pipeline lining are turned over in such a way that the previously formed inner side of the pipeline lining is turned outwards, or inverted, by means of compressed air. The inverter add-on 40 can also be referred to as a pipeline lining adapter.

In FIG. 2a the inverter add-on 40 is shown without an inserted pipeline lining 80. In FIG. 2b the function of the inverter add-on 40 is shown on the basis of an inserted pipeline lining 80.

The inverter add-on 40 firstly has a flange element 41. With the aid of the flange element 41 of the inverter add-on 40, it can be made possible to fasten the inverter add-on 40 to the flange element 31 of the housing 20. A ring seal 42 is provided to achieve a sealing function.

The inverter add-on 40 basically has a sealing sleeve 43 and a first fastening attachment 44. One end of the sealing sleeve 43 can be fastened to the first fastening attachment 44, for example by means of pipe clamps 46.

The second end of the sealing sleeve 43 is fastened to a second fastening attachment 47. The fastening to this fastening attachment 47 can also be achieved by means of pipe clamps 46. The sealing sleeve is preferably made of plastic.

The sealing sleeve has such a length that it can be distended in the direction of the centre 48 of the inverter add-on 40. By means of the sealing sleeve, a flexible chamber portion 50 is formed between the sealing sleeve 43 and the inverter housing portion 49.

The volume of the flexible chamber portion 50 can be made bigger or smaller. To this end, the inverter add-on 40 has a compressed air inlet 51 and a compressed air outlet 52. In the shown example the compressed air inlet 51 and also the compressed air outlet 52 can be realised as part of a 3-way valve 53. In the shown example the valve is specifically a 3-way thread ball valve. By actuation of the grip 54, compressed air can be either supplied or discharged. With increasing inlet of compressed air into the flexible chamber portion 50, the sealing sleeve 43 is distended in the direction of the centre 48 of the inverter add-on 40.

In FIG. 2*b* the distended state of the sealing sleeve 43 and thus a large volume in respect of the flexible chamber portion 50 is shown. Furthermore, fastening means 55 can be seen, with the aid of which the inverter add-on 40 can be fastened to the housing 20 or to the housing opening portion 30. The fastening means 55 are formed in this case as screw connections.

In the configuration shown in FIG. 2*b*, an inserted pipeline lining 80 can be moved on the one hand in the direction of the first housing opening 51, wherein, on the other hand, on account of the sealing sleeve the second housing opening 22 is sealed with respect to the pipeline lining to be introduced. A pressure acting on the pipeline lining 80 is not lost, but acts directly on the pipeline lining 80. This simplifies the introduction of a pipeline lining 80 into a pipe.

If the pipeline lining 80 has been fully inserted into the pipe, the compressed air located in the flexible chamber portion 50 can be discharged via the outlet 52. The sealing sleeve 43 is moved back in the direction of the lateral inverter housing portion 49, so that the volume of the flexible chamber portion 50 is made smaller again. The pressure on a pipeline lining 80 decreases in this case, so that the end of the pipeline lining 80 can be easily handled again and at the same time the inverter add-on 40 can be disassembled from the housing 20.

FIGS. 3*a* to 3*c* show the various method steps in respect of the insertion of the pipeline lining 80 and the final positioning of the pipeline lining 80 by insertion of a calibration tube 70.

FIG. 3*a* shows on the one hand that the pipeline lining 80 is already fastened at the first end 81 to the attachment element 35. Furthermore, the course of the support tube 75 is shown. The support tube 75 is fastened to the attachment element 35, drawn over the first end 81 of the pipeline lining 80. The support tube 75 is placed through the manhole 99 in the direction of the pipe 100. With the aid of the support tube 75, the pipeline lining 80 can consequently be laid purposefully in the direction of the pipe 100. According to the first state of the apparatus 10, the inverter add-on 40 is fastened to the second housing opening 22. The calibration tube 70 remains on the winding apparatus 25 whilst the pipeline lining 80 is being inserted into the pipe 100.

The pipeline lining 80 is inserted over the desired length into the pipe 100 by means of compressed air. This state is shown in FIG. 3*b*.

Once the pipeline lining 80 has been fully introduced into the pipe 100, the pipeline lining 80 is arranged in a final position in a second state of the apparatus 10. For this purpose, the inverter add-on 40 is removed from the second housing opening 22. Instead of the inverter add-on 40, a cover plate 25 is fitted on the second housing opening 22. Prior to the removal of the inverter add-on 40, the pressure or the compressed air must be discharged from the inverter add-on 40 and/or from the housing 20.

The cover plate 45 is fitted on the second housing opening 22 in such a way that the latter is fully closed. In this second state the first end 81 of the pipeline lining 80 and also the optionally fastened support tube 75 is firstly removed from the attachment element 35. The calibration tube 70 is drawn in the direction of the first housing opening 21 by gripping of the first end 71 and is likewise fastened to the attachment element 35 in an inverted state.

The pipeline lining 80 is then pushed by the first end 81 over the first end 71 of the calibration tube 70. The support tube 75 can then be pushed or drawn over the first end 81 of the pipeline lining 80. In this arrangement, the calibration tube, the pipeline lining and the support tube are fastened to the attachment element 35.

As shown in FIG. 3*c*, in this fastened form the calibration tube can be shunted into the pipeline lining 80 by means of an application of compressed air. On account of the application of compressed air to the calibration tube 70, the pipeline lining 80 can be pushed outwards, so that the pipeline lining 80, for example with the side impregnated with resin, can be pressed outwards, i.e. in the direction of the pipe 100.

If the calibration tube 70 is positioned fully in the pipeline lining 80, the pipeline lining 80 can be fully positioned. The calibration tube 70 can then be removed.

It is possible that further curing steps are then performed. The pipeline lining 80 can be cured for example by means of steam or by means of infrared radiation.

LIST OF REFERENCE SIGNS

10 apparatus
20 housing
21 first housing opening
22 second housing opening
23 housing portion
25 winding apparatus
26 compressed air port
27 manometer
30 housing opening portion
31 flange element
33 guide portion
35 attachment element
40 inverter add-on
41 flange element
42 ring seal
43 sealing sleeve
44 first fastening attachment
45 cover plate
46 pipe clamp
47 second fastening attachment
48 centre of inverter add-on
49 inverter housing portion
50 flexible chamber portion
51 compressed air inlet
52 compressed air outlet
53 3-way valve
54 grip
55 fastening means
70 calibration tube
71 first end of the calibration tube
72 second end of the calibration tube
75 support tube
80 pipeline lining
81 first end of the pipeline lining
82 inner side
83 outer side
88 tension belt
90 transport apparatus
91 roller
92 grip portion
93 frame
99 manhole
100 pipe
A1 first housing opening axis
A2 second housing opening axis
α angle between housing opening axes

The invention claimed is:

1. An apparatus for inserting a pipeline lining into a pipe and for final positioning of the pipeline lining inserted in a pipe, comprising a housing, especially a drum-shaped housing, wherein a winding apparatus is formed in the housing and an attachment element, especially an attachment ring, is formed on a first housing opening, wherein either a cover plate or an inverter add-on is fastened to an at least second housing opening, wherein, in a first state for inserting the pipeline lining, the inverter add-on and, in a second state for final positioning of the pipeline lining, the cover plate is fastened to the second housing opening.

2. The apparatus according to claim 1, characterized in that the inverter add-on has a sealing sleeve and/or at least one compressed air port.

3. The apparatus according to claim 1, characterized in that the housing has a compressed air port.

4. The apparatus according to claim 1, characterized in that a guide portion for guiding through the pipeline lining runs in the housing starting from the second housing opening to the first housing opening.

5. The apparatus according to claim 1, characterized in that in the first state a calibration tube is wound on the winding apparatus.

6. A method for inserting a pipeline lining into a pipe and for final positioning of the pipeline lining inserted in a pipe, the method comprising the following steps:

a) providing an apparatus according to claim 1, wherein a calibration tube is wound on the winding apparatus, b) fastening the inverter add-on to the second housing opening, c) guiding a first end of the pipeline lining from the second housing opening to the first housing opening and fastening the first end of the pipeline lining to the attachment element, d) building up a pressure, especially by means of compressed air, at the inverter add-on and/or in the housing, e) inserting the pipeline lining into the pipe.

7. The method according to claim 6, characterized in that between step c) and e), a support tube is laid in portions in the direction of the pipe starting from the attachment element, wherein the support tube, drawn over the first end (81) of the pipeline lining, is fastened to the attachment element.

8. The method according to claim 6, characterized by the step f), in which, once step e) has been completed, the pressure, especially the compressed air, is discharged from the inverter add-on and/or from the housing.

9. The method according to claim 8, characterized in that in step g) the inverter add-on is removed from the housing and the cover plate is fastened to the second housing opening in such a way that the second housing opening is closed.

10. The method according to claim 8, characterized in that in step h) the first end of the pipeline lining and the optionally fastened support tube are removed from the attachment element.

11. The method according to claim 10, characterized in that in step i) a first end of the calibration tube is unwound from the winding apparatus and is fastened to the attachment element.

12. The method according to claim 11, characterized in that in step j) the first end of the pipeline lining and optionally the support tube is drawn over the first end of the calibration tube and is fastened to the attachment element.

13. The method according to, claim 10, characterized in that in step k) a pressure is built up in the housing, especially by means of compressed air, wherein the calibration tube is positioned and expanded in the pipeline lining on account of the pressure build-up, and the pipeline lining is thus arranged in its final position.

14. The method according to, claim 12, characterized in that in step k) a pressure is built up in the housing, especially by means of compressed air, wherein the calibration tube is positioned and expanded in the pipeline lining on account of the pressure build-up, and the pipeline lining is thus arranged in its final position.

* * * * *